United States Patent
Orlandi

[19]

[11] Patent Number: 5,899,230
[45] Date of Patent: May 4, 1999

[54] DEVICE TO CONTROL THE RATE OF FLOW FOR VALUES THAT MIX HOT AND COLD WATER

[75] Inventor: Alessio Orlandi, Castiglione Delle Stiviere, Italy

[73] Assignee: Galatron SRL, Delle Stiviere, Italy

[21] Appl. No.: 08/741,199

[22] Filed: Oct. 29, 1996

[30]  Foreign Application Priority Data

Nov. 3, 1995 [IT] Italy ................................ RM95A0725

[51] Int. Cl.$^6$ ................................................... F16K 11/02
[52] U.S. Cl. ..................................... 137/625.17; 251/288
[58] Field of Search ........................... 137/625.17, 625.4, 137/454.6; 251/285, 288

[56]  References Cited

U.S. PATENT DOCUMENTS

| | | | |
|---|---|---|---|
| 4,610,272 | 9/1986 | Gottwald et al. | 137/625.17 |
| 4,708,172 | 11/1987 | Riis | 137/625.17 |
| 5,082,023 | 1/1992 | D'Alayer De Costemore D'Arc | 137/625.17 X |
| 5,363,880 | 11/1994 | Hsieh | 137/625.17 |
| 5,386,852 | 2/1995 | Bosio | 137/625.4 X |

FOREIGN PATENT DOCUMENTS

| | | |
|---|---|---|
| 568013 | 11/1993 | European Pat. Off. . |
| 609720 | 8/1994 | European Pat. Off. . |
| 2630181 | 10/1989 | France . |
| 2665500 | 2/1992 | France . |

*Primary Examiner*—John Fox
*Assistant Examiner*—John Bastrarelli
*Attorney, Agent, or Firm*—Stevens, Davis, Miller & Mosher, L.L.P.

[57]  ABSTRACT

A device to control the rate of flow for valves that mix hot and cold water, the valves comprising a cartridge body (15) with a cylindrical upper neck (18) and incorporating valve means consisting of small superimposed plates. At least one small plate is stationary in the cartridge body (15). The other small plate can be displaced on the stationary plate by an operating lever (16) pivoted on a supporting sleeve (20) able to rotate in that neck (18). The operating lever (16) can be rotated together with the supporting sleeve (20) about a vertical axis "x" to change the proportions of incoming hot and cold water and is capable of oscillations on a transverse pivot (19) borne by the sleeve (20) to change the quantity of water leaving the valve. The control device includes an element (22) for controlling the rate of flow in association with a surface (16*a*) of the operating lever (16). The control element (22) including means defining a plurality of separate reciprocal positions of a side of the control element in overlapping relation to the surface (16*a*) of the operating lever (16). The control element (22) being able to be moved along the longitudinal axis of the operating lever (16).

20 Claims, 2 Drawing Sheets

DEVICE TO CONTROL THE RATE OF FLOW FOR VALUES THAT MIX HOT AND COLD WATER

This invention concerns valves to mix hot and cold water and, to be more exact, concerns a device to control the rate of flow of the water in those valves.

The state of the art includes mixing valves which comprise within a cartridge body valve means consisting of two superimposed small plates made of a ceramic material or a like material and equipped with passages for the separate entry of hot and cold water and with an aperture for the outlet of the hot water, cold water or a mixture of hot and cold water.

One small plate is immovably fixed in the cartridge body, whereas the other small plate can be displaced and be positioned by an operating lever capable of oscillating on a transverse pivot and of rotating about a vertical axis, the cartridge body being secured in a tap body by means of a clamping ring.

The oscillations of the operating lever normally cause the opening and closing of the valve means so as to deliver or stop the water. The rotation of the lever in one direction or the other is intended to stabilize the angular position of the movable small plate on the stationary small plate so as to deliver hot water or cold water or to mix the two types of water in different proportions.

A problem to be overcome efficiently in this type of mixing valves has always been the ability to adjust the maximum rate of flow of the delivered water when the valve is fully open.

This ability is to be favored for a more advantageous use of the mixing valves and for preventing undue waste of water and, in particular, hot water with a view to achieving a substantial saving of energy.

Devices with various embodiments, sometimes complex and not reliable and not always efficient, have been disclosed for performing such a function.

DE-A-3.202.040, for instance, discloses a device to control the rate of flow, the device consisting of a stop sleeve inserted into the neck of the rotary guide sleeve in which the operating lever is lodged.

In this case the stop sleeve comprises an inner wall including a segment which is progressively tapered conically towards the inside of the cartridge.

By circumferential adjustment of the position of the stop sleeve and therefore of the tapered conical segment, the maximum angle of oscillation of the operating lever is reduced in a desired manner, and thus the maximum rate of flow which can be delivered by the mixing valve is limited.

This device, however, is rather complicated in fabrication, assembly and adjustment.

In fact, to alter the rate of flow, it is necessary to remove the stop sleeve from the guide sleeve, to withdraw it fully, to rotate it and to fit it again in the new position.

Moreover, seeing that the adjustment is achieved according to the position of the tapered segment of the stop sleeve, it is difficult to define exact separate values of the maximum rate of flow obtainable since this is carried out at the expense of the accuracy and the immediate perception, by the user, of the set desired value of the rate of flow.

DE-A-3.244.121 discloses a further device to adjust the rate of flow, this device including an auxiliary annular element cooperating with the lower end of the operating lever and capable of being displaced radially in such a way as to condition the limit values of oscillation of that lever in cooperation with the tapered sidewalls of the guide sleeve within which the operating lever oscillates.

This device too, however, is difficult to construct, hard to reach and to adjust; moreover, in this case too it is difficult to define separate maximum flow values which can be perceived at once by a user.

Italian Patent Application No. MN92A000011 discloses a device to control the rate of flow which consists of a cap associated with the upper end of the operating lever. This cap includes on each of its sides extensions of different thicknesses which come into contact in different manners, according to the position of the fitting of that cap, against the end of travel of the lever corresponding to the position of maximum rate of flow which can be delivered by the valve.

This embodiment is satisfactory in itself but entails the drawback that, to vary the rate of flow to the desired value, it is necessary to dismantle the cap from the lever, to remove the cap completely and to fit it again in the desired position.

In view of the small dimensions of these elements this operation may involve great working difficulties.

Moreover, this embodiment makes possible, as a maximum, four different values of the maximum rate of flow which can be delivered.

Furthermore, this embodiment makes necessary a dimensional standard of the upper part of the lever, thus preventing the cartridge employing this embodiment from being interchangeable with the normal cartridges which do not include this control element.

Moreover the perception of the different thicknesses may be not immediate and may entail mistakes in positioning and therefore in the adjustment.

It is therefore the purpose of this invention to equip a mixing valve of the above type with a new original device to adjust the rate of flow of the water delivered, this device being intended to interact with the operating lever of the valve.

The valve to mix hot and cold water with a device to adjust the rate of flow of the water delivered, as disclosed here, conforms substantially to claim 1.

The invention is embodied with a flow control element which cooperates with only one surface of the operating lever and is associated with that surface; moreover, this control element according to the invention is clamped to that surface of the operating lever by the engagement handle without any other means when the handle is fixed to the lever.

Above all, the handle and the lever keep their usual dimensions in the coupling parts without any modification.

The flow control element according to the invention in the installed position remains contained within the overall bulk of the operating lever, and therefore can be employed in standard cartridges perfectly interchangeable with the normal cartridges on the market.

Moreover, the flow control element according to the invention has a plurality of relative positions on the axis of the lever, these positions corresponding to as many values of maximum flow as can be delivered by the mixing valve.

The adjustment of the position of the flow control element according to the invention is carried out by displacing axially by hand upwards or downwards that control element on the lever, thus obtaining in that direction a plurality of different positions.

According to a variant this plurality of different positions is defined and numerically limited.

This control element is guided on the lever and therefore can be displaced, according to the desired adjustment, without having to be separated from the lever itself.

Moreover, in the case of a variant each separate position of the control element in relation to the lever corresponds to a given pre-set value of the set value of the maximum rate of flow which can be delivered.

Furthermore, a user can see at once that, by displacing the control element downwards, the oscillation of the operating lever is more greatly limited and therefore the maximum rate of flow which can be delivered is reduced.

Greater details of the invention will be made clearer in the non-restrictive example disclosed hereafter in the description with reference to the attached drawings, in which:

DETAILED DESCRIPTION OF THE INVENTION

A mixing valve normally comprises a cartridge body 15 which is fixed by means of a clamping ring nut and a counter-ring nut (not shown here) in a tap body equipped in a known manner with pipes for separate delivery of hot water and cold water and with an outlet for delivery of the water for use.

Figure 5:
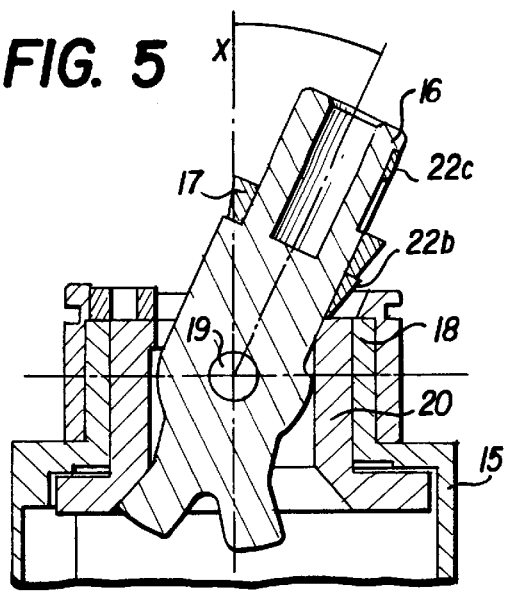
FIG. 5 shows a partial longitudinal section of a mixing valve in the fully opened position.
Figure 5A:
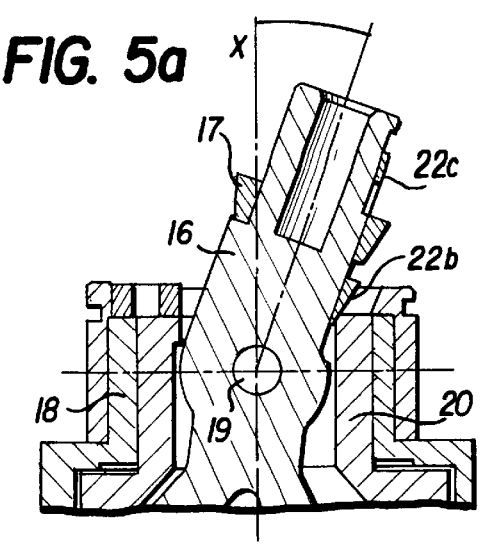
FIGS. 5a, 5b and 5c shows as many views of a section as in claim 5, but with the valve respectively in a first opened position, a second opened position and a third opened position, all these positions being different.

Valve means are fitted in the cartridge body 15 and consist, for instance, of two small superimposed plates, of which a lower plate is stationary and an upper plate is movable; this upper plate can be displaced on the lower stationary plate by means of an operating lever 16, which is associated with an engagement handle (referenced with 17 and shown partly in FIGS. 5 and 5a).

The small stationary and movable plates together define inlet and outlet passages for the hot and cold water to be delivered to the outlet of the tap.

The operating lever 16 is fitted in a known manner on a horizontal pivot 19 secured transversely in a supporting sleeve 20 rotatably fitted within a neck 18 of the cartridge body 15.

In this way, the operating lever 16 is capable of oscillations on the horizontal pivot 19 and of rotations about a vertical axis "x" coinciding with the axis of the rotary supporting sleeve 20.

With rotation of the operating lever 16 about the vertical axis "x" there corresponds the choice of the type of hot or cold water to be delivered, that is to say, the mixing of the water as desired. The oscillation of the operating lever 16 on the transverse pivot 19 causes the opening or closing of the mixing valve and controls the flow of the delivered water.

The adjustment of the flow of water is achieved by changing the angle of oscillation of the lever 16.

According to this invention a control element 22 is attached to the operating lever 16 so as to adjust the flow of water.

The element 22 controlling the flow has the form of an elongate flattened body which cooperates with a grooving 16b provided on one of the surfaces of the operating lever 16, in this case on the rear surface 16a.

In this example the grooving 16b comprises two rows of parallel teeth positioned on the sides of the coupling surface 16a of the operating lever 16, these teeth starting substantially from the upper end of the operating lever 16.

According to a variant of the embodiment, the grooving 16b can be continuous along a whole segment of the coupling surface 16a and can also be arranged in an intermediate desired position on that surface 16a of the operating lever 16.

The control element 22 has in its lower portion a wedge-shaped part 22b, which in this case is conformed with steps on its outer face.

According to a variant, the wedge-shaped part 22b is smooth on its outer face.

The control element 22 includes a flat part 22a of a reduced thickness above the wedge-shaped part 22b.

Figure 6:
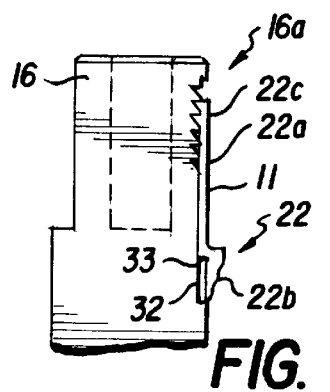
FIG. 6 shows a partial longitudinal section of the operating lever with the flow control element according to the invention in the fitted position.

In this case the flat part 22a of a reduced thickness lies on a plane which is positioned inwardly in relation to the wedge-shaped part 22b and in a position displaced towards the coupling surface 16a of the operating lever 16 (FIG. 6).

The lateral edges 35 of the flat part 22a of a reduced thickness cooperate with the engagement handle 17 in anchorage of the control element 22 to the operating lever 16.

In the flat part 22a of a reduced thickness there is included in this case a substantially rectangular window 10 having a shape mating with a raised segment 11 on the coupling surface 16a of the operating lever 16. In this configuration the control element 22 when fitted is wholly contained within the overall lateral bulk of the operating lever 16.

Fins 13 are included on the opposite long sidewalls 12 of the rectangular window 10 and cooperate with the inwardly angled or grooved conformation of the sidewalls 14 of the segment 11 having a greater thickness.

This configuration enables the control element 22 to slide upwards or downwards in a guided manner on the operating lever 16. This sliding occurs without the need to release the element 22 from the lever 16, without any risk that the control element 22 becomes detached from the lever 16 and without increasing in any position the lateral bulk of the operating lever 16, except in the zone where the lower wedge-shaped portion 22b acts.

Figure 4:
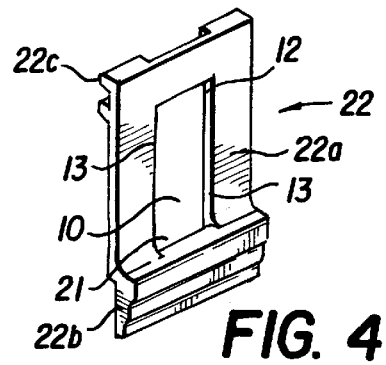
FIG. 4 shows a three-dimensional view of the flow control element according to the invention.

The rectangular window 10 in the control element 22 in this case has the form of a through window open at its lower end 21, corresponding with the coupling surface 16a of the operating lever 16. As apparent in FIGS. 4 and 6, window 13 is open downwards at its lower end 21 because the wedge-shaped element 22b lies on a plane different from the plane on which flat element 22a lies.

According to other forms of embodiments the rectangular window 10 can be defined by a hole delimited at its upper and lower end or else by a window open in the upward direction.

The control element 22 is equipped in its upper part with at least one gripping tooth 22c in such a way that it can be attached to the mating grooving 16b of the operating lever 16 while remaining within the overall outline of that lever 16.

Figure 1:
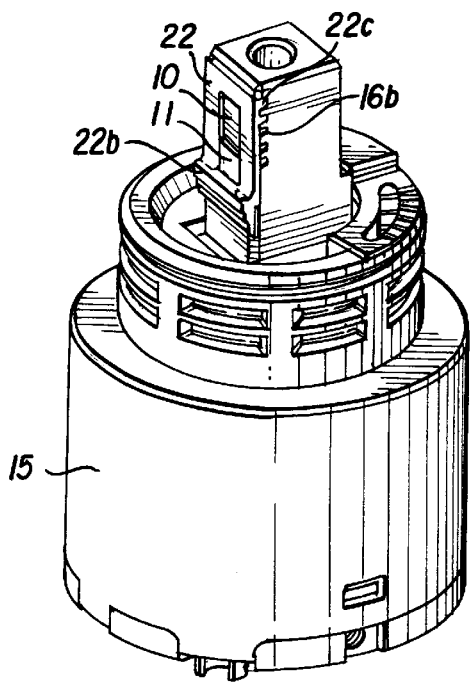
FIG. 1 shows a three-dimensional view of the cartridge complete with a device to adjust the rate of flow according to the invention.
Figure 3:
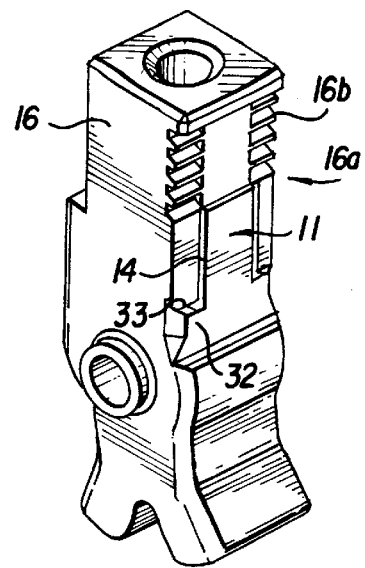
FIG. 3 shows a three-dimensional view of the operating lever of the valve, as structured to receive a flow control means according to the invention.
Figure 2:
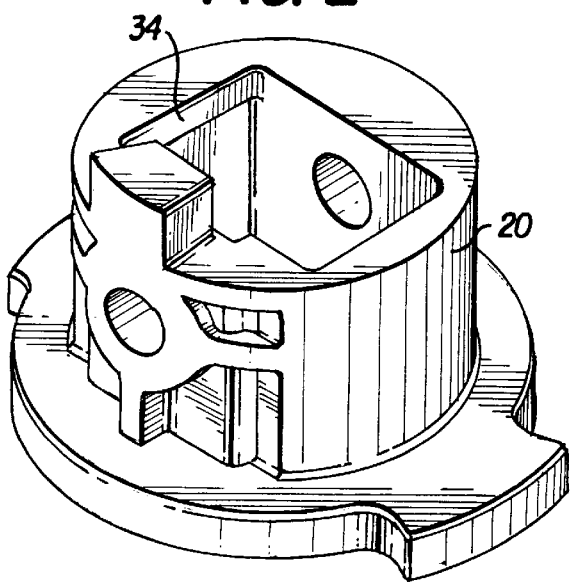
FIG. 2 shows a three-dimensional view of a rotary sleeve of the valve.

The grooving 16b can have sawblade teeth having downwardly inclined surfaces, as shown in FIG. 3. This enables control element 22 to be lowered without having to be detached from the operating lever 16, while ensuring at the same time contact of the wedge-shaped portion 22b against the coupling surface 16a of the operating lever 16.

Figure 7A:
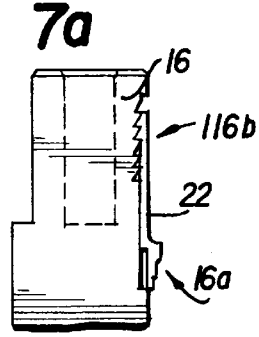
FIGS. 7a and 7b show two embodiments of variants of the grooving on the operating lever.

According to a variant, the grooving 116b of the control element 22 is conformed as sawblade teeth with upwardly inclined surfaces (FIG. 7a) to enable the control element 22 to be moved upwards on the operating lever 16.

Figure 7B:
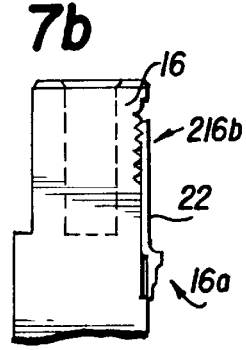

According to another variant (FIG. 7b), the grooving 216b of the control element 22 is defined by teeth formed with a pair of inclined surfaces sloping towards each other in an opposite manner to enable the control element 22 to be guided in sliding upwards or downwards without having to be detached even partly from the operating lever 16.

The wedge-shaped portion 22b cooperates with a flat supporting wall 32 starting from an abutment 33. This abutment 33 defines also the limit of downward travel of the control element 22.

The wedge-shaped portion 22b of the control element 22 is positioned to be inserted between the operating lever 16 and the rotary sleeve 20 and acts as a spacer on the side towards which the lever 16 is displaced upon opening of the valve.

To be more exact, the wedge-shaped portion 22b is inserted between the supporting wall 32 and a bevel 34 positioned on the inner periphery of the rotary sleeve 20 on the side which cooperates with the rear surface of the operating lever 16.

The wedge-shaped portion 22b thus restricts the length of oscillation of the lever 16 and therefore the flow of the delivered water.

The control element 22 can be positioned at various heights on the operating lever 16, each of these heights corresponding to a well determined value of maximum deliverable flow, and therefore the wedge-shaped portion 22b restricting the oscillation of the lever 16 will be inserted more or less within the space between the operating lever 16 and the rotary sleeve 20.

Figure 5B:
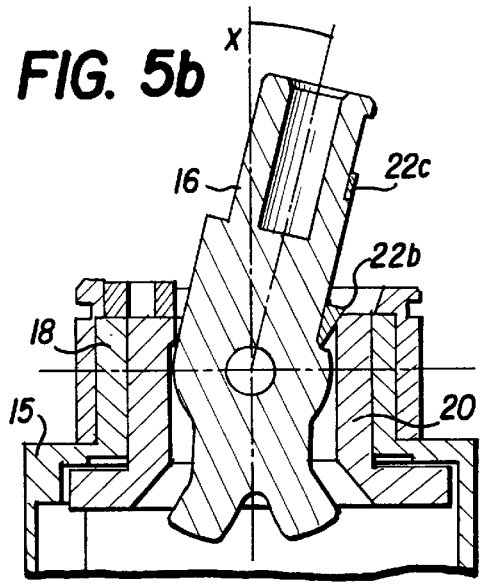
Figure 5C:
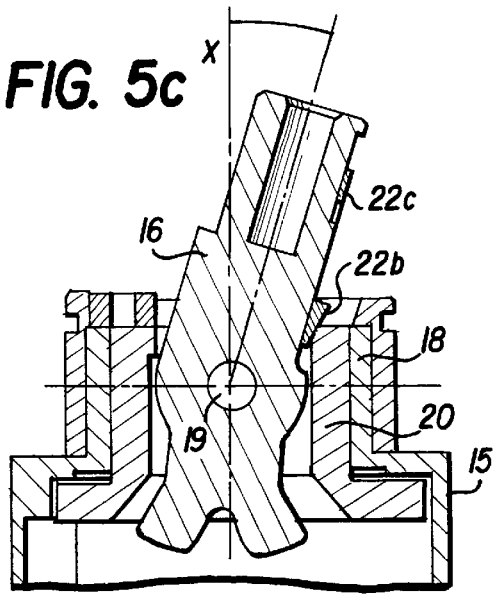

In effect, such a wedge-shaped portion 22b of the control element 22, by contacting more or less early the rotary sleeve 20, as shown in FIGS. 5a, 5b and 5c, enables the oscillation of the lever 16 to be varied. This varies the degree of maximum opening of the valve to control as desired the quantity of water delivered when the valve is fully open.

The control element 22 can also be located at a height at which it is ineffective, as shown in FIG. 5, thus permitting also the complete opening of the valve when no limitation of the flow is required.

I claim:

1. A device to control the rate of flow for valves that mix hot and cold water, the valves comprising a cartridge body (15) with a cylindrical upper neck (18) and incorporating valve means comprising small superimposed plates, of which at least one said small plate is stationary in the cartridge body (15), whereas the other said small plate is displacable on the stationary plate by an operating lever (16) pivoted on a supporting sleeve (20) able to rotate in that neck (18), whereby the operating lever (16) is rotatable together with the supporting sleeve (20) about a vertical axis "x" to change the proportions of incoming hot and cold water and is capable of oscillations on a transverse pivot (19) borne by the sleeve (20) to change the quantity of water leaving the valve, said device comprising:

a control element (22) for controlling the rate of flow of water in association with a coupling surface (16a) of the operating lever (16) and including means defining a plurality of separate reciprocal positions for holding a side of said control element (22) in overlapping relation to the coupling surface (16a) of the operating lever (16), the control element (22) being movable parallel to the longitudinal axis of the operating lever (16) from a first said position to a second said position while continuously maintaining contact with said operating lever (16).

2. A flow control device as in claim 1, in which the control element (22) includes at its lower end a wedge-shaped portion (22b) cooperating with one side of the positioning seating included in the rotary sleeve (20) in the part towards which the lever (16) is displaced during opening of the valve.

3. A flow control device as in claim 2, in which the wedge-shaped portion (22b) includes a plurality of steps on its outer surface.

4. A flow control device as in claim 1 in which the wedge-shaped portion (22b) is smooth on its outside surface.

5. A flow control device as in claim 1 in which the control element (22) includes above the wedge-shaped portion (22b) a flat portion (22a) of a reduced thickness.

6. A flow control device as in claim 5, in which the flat portion (22a) of reduced thickness lies on a first plane which is closer to the coupling surface (16a) of the operating lever (16) in a relation to a second plane upon which lies the wedge-shaped portion (22b).

7. A flow control device as in claim 5, in which the sides (35) of the flat portion (22a) of reduced thickness cooperate with an engagement handle (17) in the clamping of the control element (22) on the operating lever (16).

8. A flow control device as in claim 5, in which the flat portion (22a) of reduced thickness includes a substantially elongate window (10).

9. A flow control device as in claim 8, in which the window (10) is a through window and is open downwards at its lower end.

10. A flow control device as in claim 8, in which the window (10) is a through window and is open upwards at its upper end.

11. A flow control device as in claim 8, in which the window (10) is a hole delimited at its lower and upper ends.

12. A flow control device as in claim 8, in which the window (10) cooperates with longitudinal tapered portions included on the coupling surface (16a) of the operating lever (16) and defining a raised segment (11).

13. A flow control device as in claim 12, in which the raised segment (11) includes on its lateral edges (14) guide means cooperating with fins (13) present on the inner side of the long sidewalls (12) of the window (10).

14. A flow control device as in claim 5, in which the coupling surface (16a) of the operating lever (16) includes positioner groovings (16b) cooperating with mating teeth (22c) on the flat portion (22a) of reduced thickness of the control element (22).

15. A flow control device as in claim 14, in which the positioner means comprise a grooving (216b) having teeth defined by a pair of inwardly sloping and inversely inclined surfaces.

16. A flow control device as in claim 14, in which the positioner means comprise a grooving (16b) of a type with sawblade teeth having a surface inclined downwards.

17. A flow control device as in claim 14, in which the positioner means comprise a grooving (116b) of a type with sawblade teeth having a surface inclined upwards.

18. A flow control device as in claim 2, in which the positioning seating in the rotary sleeve (20) has a bevel (34) for cooperating with the wedge-shaped portion (22b) of the control element (22).

19. A device to control the rate of flow of hot and cold water comprising:

a valve for mixing hot and cold water, said valve comprising a cartridge body (15) with a cylindrical upper neck (18) and containing small superimposed plates, at least one said small plate being stationary in the cartridge body (15), the other said small plate being displacable on the stationary plate by an operating lever (16) pivoted on a supporting sleeve (20) able to rotate in the neck (18), the operating lever (16) being rotatable together with the supporting sleeve (20) about a vertical axis "x" to change the proportions of incoming hot and cold water and being capable of oscillations on a transverse pivot (19) borne by the sleeve (20) to change the quantity of water leaving the valve, and a control element (22) for controlling the rate of flow in association with a surface (16a) of the operating lever (16) and including means for cooperating with the coupling surface (16a) to define a plurality of separate positions of a side of said control element in overlapping relation to the coupling surface (16a) of the operating lever (16), the control element (22) being movable in a reciprocal relationship with the operating lever (16) from each said position to each other said position without losing contact with said operating lever (16).

20. A flow control device of claim 19, wherein the control element includes at its lower end a wedge-shaped portion cooperating with one side of the positioning seating included in the rotary sleeve in the part towards which the lever is displaced during opening of the valve, wherein the wedge-shaped portion is slidable along the same side of the lever in all of the separate reciprocal positions.

* * * * *

UNITED STATES PATENT AND TRADEMARK OFFICE
CERTIFICATE OF CORRECTION

PATENT NO. : 5,899,230
DATED : May 4, 1999
INVENTOR(S) : Orlandi

It is certified that error appears in the above-identified patent and that said Letters Patent are hereby corrected as shown below:

Line [73], change "Delle Stiviere, Italy" to --Castiglione Delle Stiviere (MN), Italy--

Signed and Sealed this

Seventeenth Day of April, 2001

Attest:

NICHOLAS P. GODICI

Attesting Officer    Acting Director of the United States Patent and Trademark Office